US009773269B1

(12) United States Patent
Lazarus

(10) Patent No.: US 9,773,269 B1
(45) Date of Patent: Sep. 26, 2017

(54) IMAGE-SELECTION ITEM CLASSIFICATION

(71) Applicant: Amazon Technologies, Inc., Reno, NV (US)

(72) Inventor: Alfred Jerome Lazarus, Hyderabad Andhra Pradesh (IN)

(73) Assignee: Amazon Technologies, Inc., Reno, NV (US)

( * ) Notice: Subject to any disclaimer, the term of this patent is extended or adjusted under 35 U.S.C. 154(b) by 937 days.

(21) Appl. No.: 14/031,891

(22) Filed: Sep. 19, 2013

(51) Int. Cl.
*G06Q 30/00* (2012.01)
*G06Q 30/06* (2012.01)

(52) U.S. Cl.
CPC ................. *G06Q 30/0623* (2013.01)

(58) Field of Classification Search
CPC ................................................ G06Q 30/0623
USPC ....................................................... 705/26, 27
See application file for complete search history.

(56) References Cited

U.S. PATENT DOCUMENTS

| | | | | |
|---|---|---|---|---|
| 8,904,493 B1 * | 12/2014 | Dibble | ................... | H04L 63/08 726/4 |
| 2008/0140502 A1 * | 6/2008 | Birnholz | ................ | G06Q 30/02 705/14.72 |
| 2011/0184804 A1 * | 7/2011 | Sontag | .................. | G06F 21/335 705/14.49 |
| 2012/0207389 A1 * | 8/2012 | Ghatare | ............ | G06F 17/30253 382/173 |
| 2012/0232987 A1 | 9/2012 | Everingham | | |
| 2012/0323700 A1 * | 12/2012 | Aleksandrovich | ..... | G06Q 30/00 705/14.69 |
| 2013/0132190 A1 | 5/2013 | Lagle Ruiz et al. | | |

OTHER PUBLICATIONS

May, Patrick: "'Crowd labor' helps spur social networking revolution," Oakland Tribune, Apr. 30, 2012; ProQuest Dialog #1010284082, 5pgs.*
Anonymous: "Amazon.com Inc.; Amazon Mechanical Turk Launches New Web-Based Tools That Bring the Power of an On-Demand Workforce to Businesses Worldwide," Computer Business Week, Aug. 18, 2008; ProQuest Dialog #198100917, 4pgs.*
von Ahn et al., "reCAPTCHA: Human-Based Character Recognition via Web Security Measures," Science, vol. 321, Sep. 12, 2008, pp. 1465-1468.
U.S. Appl. No. 13/662,956, titled "Ontology-Guided Categorization of Items," filed Oct. 29, 2012.

* cited by examiner

*Primary Examiner* — Rob Pond
(74) *Attorney, Agent, or Firm* — Knobbe, Martens, Olson & Bear LLP

(57) ABSTRACT

Systems and methods are disclosed in which thematic image selection challenges including images of items available in an electronic catalog are presented to users. Unclassified items in the electronic catalog may be identified, and the unclassified items may be presented in a thematic image selection challenges to assist in classifying the unclassified items. Classified items may also be presented in the thematic image selection challenge in order to assess the reliability of user input. If a user expresses interest in an item in the thematic image selection challenge, the user may be presented with more information about the item and may also be presented with an option to purchase the item.

25 Claims, 7 Drawing Sheets

IMAGE-SELECTION ITEM CLASSIFICATION

BACKGROUND

Network-based retailers and merchants often offer thousands of items (e.g., goods and/or services) for browsing, purchasing, or otherwise selecting from an electronic catalog. The contents of an electronic catalog may change frequently as new items are added, item descriptions change, and current items sell out or become unavailable. Such items may be classified as belonging to one or more categories. Potential buyers typically browse such items though an item search engine or through indexes of the items within categories. An incorrect and/or incomplete classification of items may hinder discovery of items in the electronic catalog.

BRIEF DESCRIPTION OF THE DRAWINGS

Throughout the drawings, reference numbers are re-used to indicate correspondence between referenced elements. The drawings are provided to illustrate embodiments of the disclosure and not to limit the scope thereof.

DETAILED DESCRIPTION

I. Overview

Figure 1:
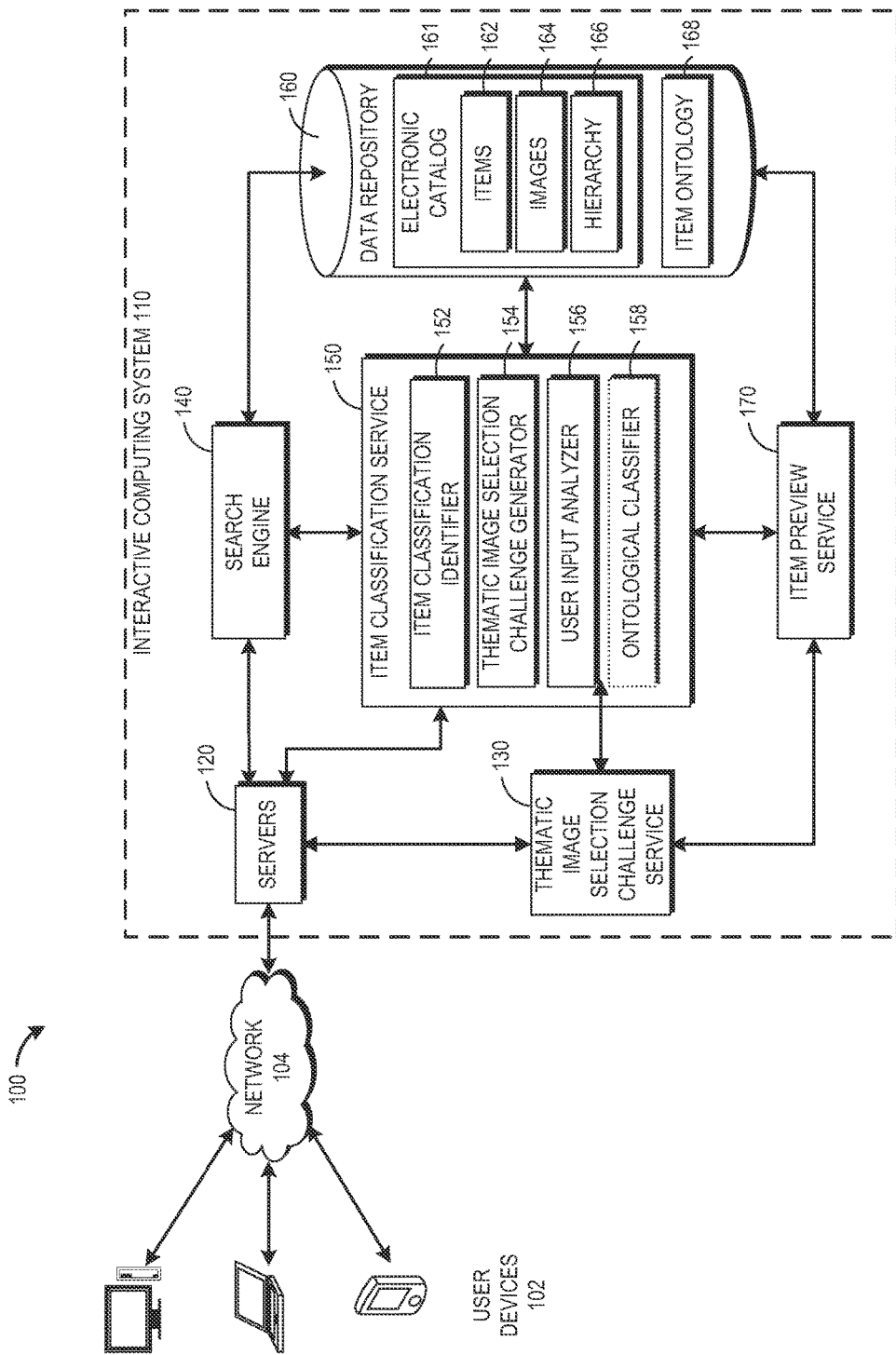
FIG. 1 depicts an embodiment of a network environment for providing users with access to an interactive computing system for viewing item images in a thematic image selection challenge.

A CAPTCHA (Completely Automated Public Turing Test to Tell Computers and Humans Apart) is a type of challenge-response test used in computing environments to determine whether a user is human. CAPTCHAs are often used to curb nefarious actions of certain types of "bots," or automated computing programs. Such actions include indiscriminate, unsolicited electronic advertising through e-mail and message boards, skewing of network-based polls, or collection of secure data. Due to the prevalence of bots as well as the undesired actions of bots, CAPTCHAs are widely implemented to prevent bots from abusing various types of network services or from collecting certain types of sensitive information. For example, a CAPTCHA may be presented to a user upon a request to access a network resource (e.g., a web page), and the system will only allow access to users who successfully respond to the CAPTCHA challenge. Presumably, humans will successfully respond to the CAPTCHA challenge while bots will not.

The effectiveness of CAPTCHAs as security measures has caused their use to become relatively widespread. Due to the increasing ability of bots to bypass certain text-based CAPTCHA challenges using optical character recognition techniques, image-based CAPTCHA challenges have been developed. For example, a thematic image selection challenge, which may be an image-based CAPTCHA, may challenge a user to identify images with a common theme from a selection of images. Consequently, presenting images of items in the electronic catalog for selection in a thematic image selection challenge may be useful in determining classifications and relationship among the items.

The present disclosure relates to classifying items in an electronic catalog utilizing crowd-sourced data gathered from a thematic image selection challenge, for example, an image-based CAPTCHA challenge. Language-based classification techniques can be used to attempt to classify unclassified, or incorrectly classified, items. However, language-based classification techniques may not be capable of classifying certain items, for example, items having titles or descriptions that lack known keywords associated with categories. Such items may be represented, for example, on a network page (e.g., web page) describing an item (e.g., an item detail page) by an item description and a digital image or images depicting the item. Therefore, the image depicting the item may be presented to users of a thematic image selection challenge system in order to determine category information about the item.

For example, an item classification service may communicate with an electronic catalog service that manages data regarding a plurality of items, and also with a thematic image selection challenge service which presents thematic image selection challenges to users of computing services. The item classification service may identify items within the electronic catalog which are unclassified, or which are likely to be incorrectly classified (both of which may be referred to hereafter as "unclassified items"). Images representing the unclassified items may be presented to a user of the thematic image selection challenge service together with images of items of known categories (hereafter "classified items"). The user may be asked to select images associated with a keyword. The keyword may correspond to one of the classified items, and may not correspond to another of the classified items, in order to gauge whether the user is a human by selecting the image of the classified item corresponding to the keyword and not selecting the image of the classified item that does not correspond to the keyword. If the user correctly identifies the classified item associated with the keyword, then the item classification service may determine whether any of the unclassified items have also been selected.

The keyword presented in the thematic image selection challenge may be stored in association with the item, and may be used in one implementation by an ontology classification service to determine a category for the item. In an ontology classification service, an item ontology may model an item taxonomy or hierarchy, as well as the concepts and relationships that distinguish one item from another item. The classifications may be made automatically by employing text processing engines to extract relevant terms and semantics from various information about an item, such as, for example, the title, description, and/or other relevant information about the item. Semantics may be, for example, words, meanings, and/or the relationships among words in a phrase or a sentence. A comparison and/or mapping of the relevant terms and semantics may be made to concepts in the item ontology. Based on the degree of certainty that an item corresponds to a concept, a browse node in an item taxonomy (e.g., a category) may be identified and/or created in the item taxonomy and the item may be associated with the browse node. Building, updating, and/or modifying an ontology may be an automatic and iterative process that involves extracting information from items in the taxonomy to be used in the generation of additional concepts in the ontology. One example of an ontology classifier that can be used with the systems and methods disclosed herein is disclosed in U.S. patent application Ser. No. 13/662,956, titled "ONTOLOGY-GUIDED CLASSIFICATION OF ITEMS," and filed on Oct. 29, 2012, the entirety of which is incorporated by reference.

The item classification service may receive electronic catalog information and analyze this information to identify classified and unclassified items. The electronic catalog information can be arranged hierarchically, with a general items (e.g., all products) root-level browse node category and more detailed child and descendant browse node categories. Some or all of the items may be associated with one or more categories. In particular, an item can be associated with a leaf-node category, which may be most specific to that item. In turn, this leaf-node category may be part of a broader category, which is in turn part of a broader category still, and so on, up and until the root node. While the terms "browse node," "browse category," and "category" are often used interchangeably herein, it should be understood that categories can be arranged in a flat structure instead of a hierarchical structure in some embodiments. Similarly, an electronic catalog may have a graph data representation instead of a hierarchical, tree-based representation.

Unclassified items may include items within the electronic catalog that are unclassified; or that are known to be, or that are likely to be, incorrectly classified. Such items may not be associated with nodes of a required specificity within an item taxonomy or hierarchy, or may not belong to item categories. In another example, users of the electronic catalog may mark or flag certain items as incorrectly classified. In some implementations, unclassified items may belong to a category determined to be polluted. A category may be determined to be polluted, for example, if the parent or root nodes of the category include more items than child or leaf nodes. The items totals may be calculated based upon a unique identification number associated with the items, for example, a standard identification number, a Universal Product Code (UPC), serial number, model number, part number, etc. All items in a polluted category may be considered unclassified items, or in some implementations, there may be a subset of items in the polluted category that are known to be correctly classified. In addition, an item of any category that is only classified in a parent or root node may be identified as unclassified, as more detailed classification into a child or leaf node may be desired. In some embodiments, an ontological classifier may be used at least in part to classify items within the electronic catalog, and any items that are unable to be classified by the ontological classifier may be identified as unclassified items. In some implementations, items that receive less than a threshold amount of traffic or user views may be identified as an unclassified item, because the low traffic or views may indicate that the item is improperly classified and therefore difficult for users to find when searching for items within a particular category.

Classified items may include items within the electronic catalog that are known to be correctly classified. For example, users of the electronic catalog may mark or flag certain items as correctly classified. In some implementations, items that receive more than a threshold amount of traffic or user views may be identified as a classified item. In some embodiments, an ontological classifier may be used to classify items within the electronic catalog, and any items that are able to be classified by the ontological classifier may be identified as classified items.

In one implementation, the item classification service may take measures to ensure that keywords are correctly associated with unclassified items. For example, images of the same set of classified items and unclassified items may be presented to a number of users of the thematic image selection challenge service, and the item classification service may collect data representing the image selections for each of the number of users. If the same unclassified item is selected by a threshold percentage of the number of users, then the item classification service may associate the keyword with the unclassified item. This may provide for more robust keyword associations, as user errors such as unintentional item selections, as well as instances where a bot correctly selects the associated classified item but randomly selects unclassified items, may be filtered from the data used to associate keywords with items.

In some embodiments, item classification thematic image selection challenges may be presented to users of the electronic catalog. Alternatively or additionally, item classification thematic image selection challenges may be presented to users of other networked systems or services such as e-commerce systems, e-mail systems, message boards, network-based polls, blogs, social media services, networked information retrieval systems, etc. Similarly, in some embodiments, item classification thematic image selection challenges may be implemented outside of a retail environment, such as in association with a system that provides information and/or reviews regarding products, services, movies, people, events and/or items of various other types without necessarily enabling classification of items for purposes of purchase.

The item images in the thematic image selection challenge may, in some implementations, be linked to item detail pages of the items in the respective images. If a user expresses interest in an item, the user may be provided with more information about the item. User interest in an item may be determined, in some embodiments, by the user hovering a cursor over the item image for a threshold period of time, clicking on an item image, or double clicking on an item image. Further, user interest may be determined by eye tracking programs and techniques that determine whether the user views the item image for a threshold period of time, or by the user selecting a selectable option for more information, to name some additional examples. Once user interest is determined, more information about the item may be presented to the user. For example, part or all of an item description, item price, and a link to the item detail page may be presented to the user. Thus, a user may be able to view and purchase an item of interest in an electronic catalog directly from the thematic image selection challenge. Typically, if a user sees an item of interest depicted in a thematic image selection challenge, the user must locate the item by keyword searching, as image-based searching is not very robust. The item detail page linking therefore advantageously provides a direct link to viewing or purchasing an item of interest discovered by the user in the thematic image selection challenge.

To illustrate item classification through a thematic image selection challenge, the following non-limiting example is provided. In this example, an image of what is thought to be a wallet is presented to a number of users who can attempt to classify the image. For example, an item classification service may present a user with five item images in a CAPTCHA, and the user may be prompted to select all of the wallets they see. Two out of five images may be already known to the item classification service to depict classified items. One of the classified items is a wallet and the other of the classified items is not a wallet. Therefore, the keyword "wallet" is associated with one of the classified items and not associated with the other of the classified items. The unknown images may depict unclassified items. A sample breakdown of the five item images in this example is:

(a) Wallet—Known
(b) Shirt—Known
(c) Pants—unknown
(d) Wallet—unknown
(e) Wallet—unknown To confirm whether a user is a human, and therefore likely providing useful input of unknown image selection for classifying the unclassified items, the user input should include selection of image (a), which a human user would recognize as a wallet; and must not include selection of image (b), which a human user would recognize as a shirt and not a wallet. As an example, a first user may select images (a), (d), and (e). Because the first user correctly selected image (a) and not image (b), the item classification service may determine that the unclassified item depicted by images (d) and (e) are, or are likely to be, wallets. To improve the statistical reliability of this classification, this same set of images may be shown to a number (N) of users, for example, as a CAPTCHA security service used for signup or validation pages for web sites. If the same selection is made by a threshold number or threshold percentage of the group of users, then the item classification service may tag the unclassified items depicted by images (d) and (e) with the keyword "wallet." Using this keyword, an ontology classifier can associate the unclassified items with a category or categories in an item taxonomy or hierarchy.

In addition, the unclassified item depicted by image (c) may be confirmed to not be a wallet if a threshold number or threshold percentage of the group of users, do not select image (c). If the unclassified item depicted by image (c) was previously classified as a wallet, image (c) may be shown in subsequent CAPTCHAs with different known images, and accordingly may be later identified as pants and classified correctly.

II. System Overview

Prior to describing embodiments of the thematic image selection challenge for item classification functionality in detail, an example computing system in which this functionality can be implemented will be described. Referring to FIG. 1, an embodiment of a network environment 100 is depicted that can provide users with access to an interactive computing system 110, which may provide an item classification service 150. The item classification service 150 may be in communication with a data repository 160 including an electronic catalog 161 and with a thematic image selection challenge service 130, and may be capable of classifying items 162 in the electronic catalog 161, among other features. An item preview service 170 may be in communication with the thematic image selection challenge service 130, item classification service 150, and data repository 160 in order to present users of thematic image selection challenges with previews of items presented in such challenges.

In the environment 100, users can access the interactive computing system 110 with user devices 102. The interactive computing system 110 can provide users with access to a data store 160, which may include an electronic catalog 161 in which users may buy, sell, view, or otherwise interact with items 162. In one implementation, items 162 in the electronic catalog 161 may be depicted by images 164, and may be arranged in a hierarchy 166 The data store 160 may also include an item ontology 168 used for mapping items 162 to the hierarchy 166. The interactive computing system 110 can provide a display page, e.g. web page, or other graphical user interface for some or all items 162.

The user devices 102 that access the interactive computing system 110 can include computing devices, such as desktop computers; laptop computers; tablets; personal digital assistants (PDAs); mobile phones (including smartphones); electronic book readers; wireless devices; set-top or other television boxes; media players; game consoles or controllers; televisions; one or more processor devices; integrated components for inclusion in computing devices, appliances, electronic devices for inclusion in vehicles or machinery; and kiosks, among others. The user devices 102 access the interactive computing system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the communication network 104 may be a publicly accessible network of linked networks, possibly operated by various distinct parties, such as the Internet. In some embodiments, the communication network 104 may be a private or semi-private network, such as a corporate or university intranet. The communication network 104 may include one or more wireless networks, such as a Global System for Mobile Communications (GSM) network, a Code Division Multiple Access (CDMA) network, a Long Term Evolution (LTE) network, or any other type of wireless network. The communication network 104 can use protocols and components for communicating via the Internet or any of the other aforementioned types of communication networks.

The interactive computing system 110 can be implemented with one or more physical servers or computing machines, including the servers 120 shown (among possibly others). Thus, each of the components or services depicted in the interactive computing system 110 can include hardware and/or software for performing various features. In one embodiment, the interactive computing system 110 is a network site (such as a web site) or a collection of network sites, which serve network pages (such as web pages) to users. In another embodiment, the interactive computing system 110 hosts content for one or more mobile applications or other applications executed by the user devices 102. For ease of illustration, this specification often refers to display pages in the web site context. However, these display pages are just one example of a suitable graphical user interface and can be adapted for presentation in mobile applications or other applications.

The processing of the various components or services of the interactive computing system 110 can be distributed across multiple machines, networks, or other computing resources. The various components or services of the interactive computing system 110 can also be implemented in one or more virtual machines or hosted computing environment (e.g., "cloud") resources, rather than in dedicated servers. Likewise, the data repositories shown can represent local and/or remote, physical and/or logical data storage, including, for example, storage area networks or other distributed storage systems. Moreover, in some embodiments the connections between the components or services shown represent possible paths of data flow, rather than actual connections between hardware. Executable code modules that implement various functionalities of the interactive computing system 110 can be stored in the memories of the servers 120 and/or on other types of non-transitory computer-readable storage media. While some examples of possible connections are shown, any subset of the components shown can communicate with any other subset of components in various implementations.

In one embodiment, the user devices 102 communicate with the servers 120 of the interactive computing system 110. These servers 120 can access back-end computing devices, which may implement the other functionality of the interactive computing system 110 shown. Other computing arrangements and configurations are also possible.

In the illustrated embodiment, the interactive computing system 110 includes a search engine 140. Users can browse content in the electronic catalog 160 or query the search engine 140 to obtain data regarding items from the electronic catalog stored in the data repository 160. In one embodiment, items 162 of the electronic catalog 161 can include items such as media (books, audio, video, etc.), consumer goods (clothes, electronics, groceries, etc.) and applications, to name a few. The electronic catalog 161 can include detailed information about these items, as well as services and images 164 associated with some or all of the items 162. In one embodiment, this data may be arranged in a hierarchical structure, having items associated with one or more categories or browse nodes in a hierarchy 166 (or graph). The electronic catalog 161 can provide functionality for users to browse item hierarchies in addition to searching the catalog. Users can select an item 162 represented in the hierarchy 166, in a thematic image selection challenge, or in a list of search results, to see more details about an item. In response to a user item selection, the server 120 can provide to a user device 102 a catalog page (sometimes called an item detail page) that includes details about the selected item.

The data repository 160 can include an item ontology 168. The item ontology 168 describes a set of concepts within a domain, and the relationships between those concepts. The item ontology 168 may model items in a hierarchy 166 and the features that distinguish a type of item from another. The item ontology 168 may capture semantics of relevant terms and/or phrases appearing in the electronic catalog 161 and arrange them as core concepts that describe the items 162. For example, if "neck styles" and "sleeve styles" of a shirt determine the type of a shirt (e.g., dress shirt, tank top, henley, etc.), the item ontology 168 closely resembles the shirts in terms of various neck style concepts and sleeve style concepts. Thus, an item ontology 168 may be used to classify items 162 according to their corresponding real world entities, and to arrange the items 162 into a hierarchy 166. By analyzing concepts associated with an item potentially for sale in the electronic catalog 161, the item may be properly classified and placed in a proper area of the hierarchy 166.

Data associated with a hierarchy 166 may include data describing one or more logical hierarchies that facilitates the browsing and/or purchasing of items 162, according to characteristics of the item 215, in an electronic marketplace 218. A hierarchy 166 may be characterized, for example, by a hierarchical data structure such as a tree. Thus, a hierarchy 166 may be said to have a plurality of browse nodes, where each browse node may link to a plurality of child nodes, each of which may in turn link to further child nodes. A starting point in a hierarchy 166 may be called a root node, while nodes having no child nodes are said to be leaf nodes. Child nodes, grandchild nodes, etc., of a root node may also be called descendants of the root node. Each node described within the hierarchy 166 may be thought of as a predefined way in which items 162 relate to one another. An item 162 may be associated with a plurality of hierarchies.

Data associated with the item ontology 168 may include data describing one or more ontologies for classifying the items 162 in the electronic catalog 161. By comparing the keywords, features, and characteristics of an item 162 to the item ontology 168, one or more browse nodes may be identified in the hierarchy 166 where the item 162 may reside.

As will be discussed in more detail below, the data of the electronic catalog 161 can be arranged hierarchically, with a general items (e.g., all products and services) root-level browse node category and more detailed child and descendant browse node categories. Some or all of the items may be associated with one or more categories. In particular, an item can be associated with a leaf-node category, which may be most specific to that item. In turn, this leaf-node category may be part of a broader category, which is in turn part of a broader category still, and so on, up and until the root node. While the terms "browse node," "browse category," and "category" are often used interchangeably herein, it should be understood that categories can be arranged in a flat structure instead of a hierarchical structure in some embodiments. Similarly, an electronic catalog may have a graph data representation instead of a hierarchical, tree-based representation.

The interactive computing system 110 may also include an item classification service 150 that is capable of determining categories for unclassified items in the electronic catalog 161. The item classification service 150 can be executed to classify items 162 in the electronic catalog 161 and to generate and/or modify item ontologies 168. Accordingly, various information associated with an item 162 may be accessed and/or received by the item classification service 150.

The thematic image selection challenge generation component 154 may be in communication with the thematic image selection challenge service 130, which may be a security service provided to network resources (such as web pages and mobile applications) other than or in addition to the electronic catalog 161. As an example, the thematic image selection challenge service 130 may provide image-based CAPTCHAs to a plurality of network resources, and the CAPTCHAs may be presented to users of the network resources. The input may then be used by the item classification service 150 for associating keywords with unclassified items. The thematic image selection challenge service 130 may be a service provided by the electronic catalog 161 free of charge or through a paid subscription to other network resources, and may also be implemented within the electronic catalog 161.

In the depicted embodiment, the item classification service 150 includes an item classification identification component 152, a thematic image selection challenge generation component 154, and a user input analysis component 156. Some embodiments of the item classification service 150 may optionally include an ontological classification component 158. Each of these components can be implemented in hardware and/or software.

The item classification identification component 152 can analyze the contents of the electronic catalog 161 to identify one or more unclassified items, or one or more polluted item categories. As discussed above, a category may be determined to be polluted, for example, if the parent or root nodes of the category include more items than child or leaf nodes.

Unclassified items may belong to a polluted category, may be incapable of classification by an ontological classifier, or may be determined not to be associated with one or more categories. In some implementations, an item that receives less than a threshold amount of traffic or user views may be identified as an unclassified item. The item classification identification component 152 can also analyze the electronic catalog 161 to identify one or more classified items.

The thematic image selection challenge generation component 154 may select unclassified items for presentation to users in thematic image selection challenges, for example, in image-based CAPTCHAs. One or more images 164 depicting the item may be presented in the thematic image selection challenge. Items may be selected, in one implementation, from one polluted category until a threshold number of unclassified items in the polluted category become classified items. In another embodiment, unclassified items may be selected for presentation to users based on a threshold number of views of the item detail page, or based on a merchant indication that their items are not receiving a desired amount of views. In some embodiments, one unclassified item may be presented in a thematic image selection challenge, and in another embodiment, two or more unclassified items may be presented together in the thematic image selection challenge.

The thematic image selection challenge generation component 154 may also select at least one classified item for presentation in the thematic image selection challenge. A keyword associated with the classified item may be presented to a user together with images of the selected classified and unclassified items, and the user may be asked to identify or select the image of each item associated with the keyword. In some embodiments, an image of an additional classified item known to be not associated with the keyword may also be presented to the user.

The user input analysis component 156 may receive data regarding item images selected by the user as well as keyword data. In some implementations, such data may be received by one or both of the thematic image selection challenge service 130 or the thematic image selection challenge generation component 154. The user input analysis component 156 may analyze the data to determine whether the user correctly completed the thematic image selection challenge and accordingly is (or is likely to be) a human and not a bot. For example, if the user correctly selects the classified item associated with the keyword and does not select the classified item not associated with the keyword, then the user may be determined to be a human (or likely to be a human). Accordingly, any unclassified items also selected by the user may be determined to be associated with the keyword. If the user selects the classified item not associated with the keyword, the user may be determined to be a bot (or likely to be a bot) and any other image selection inputs may be disregarded for item classification purposes.

As discussed above, the item classification service may also take measures to ensure that keywords are correctly associated with unclassified items. For example, the item classification service may collect statistical data representing the image selections for each of a number of users presented with the same or similar item images. If an unclassified item is selected by a threshold percentage of the number of users as being associated with a keyword, then the item classification service may associate the keyword with the unclassified item. This may provide for more robust keyword associations, as user errors such as unintentional item selections, as well as instances where, by chance, a bot correctly selects the associated classified item but randomly selects unclassified items, may be filtered from the data used to associate keywords with items.

Some embodiments may optionally include an ontological classification component 158. The ontological component 158 may map some or all of the keywords associated with an item, or item features inferred from the keywords, to concepts in the item ontology 168. The ontological classification component 158 may determine, based on relationships between the keywords associated with an item compared to the item ontology 168, that one keyword represents the item title, and may determine that other keywords are related to the item description. Accordingly, a type of the item may be determined as well as the relationship of the item among other items. Based on concepts identified with the item, the item may be associated with at least one appropriate browse node in the hierarchy 166 of the electronic catalog.

An item preview service 170 may be in communication with the thematic image selection challenge service 130, item classification service 150, and data repository 160 in order to present users of thematic image selection challenges with previews of items presented in such challenges. For example, if a user expresses interest in an item that is presented in a thematic image selection challenge, the item preview service 170 may present a graphical interface on the user device 102 with more information regarding the item, for example, an option to purchase the item.

III. Ontology Overview

Figure 2:
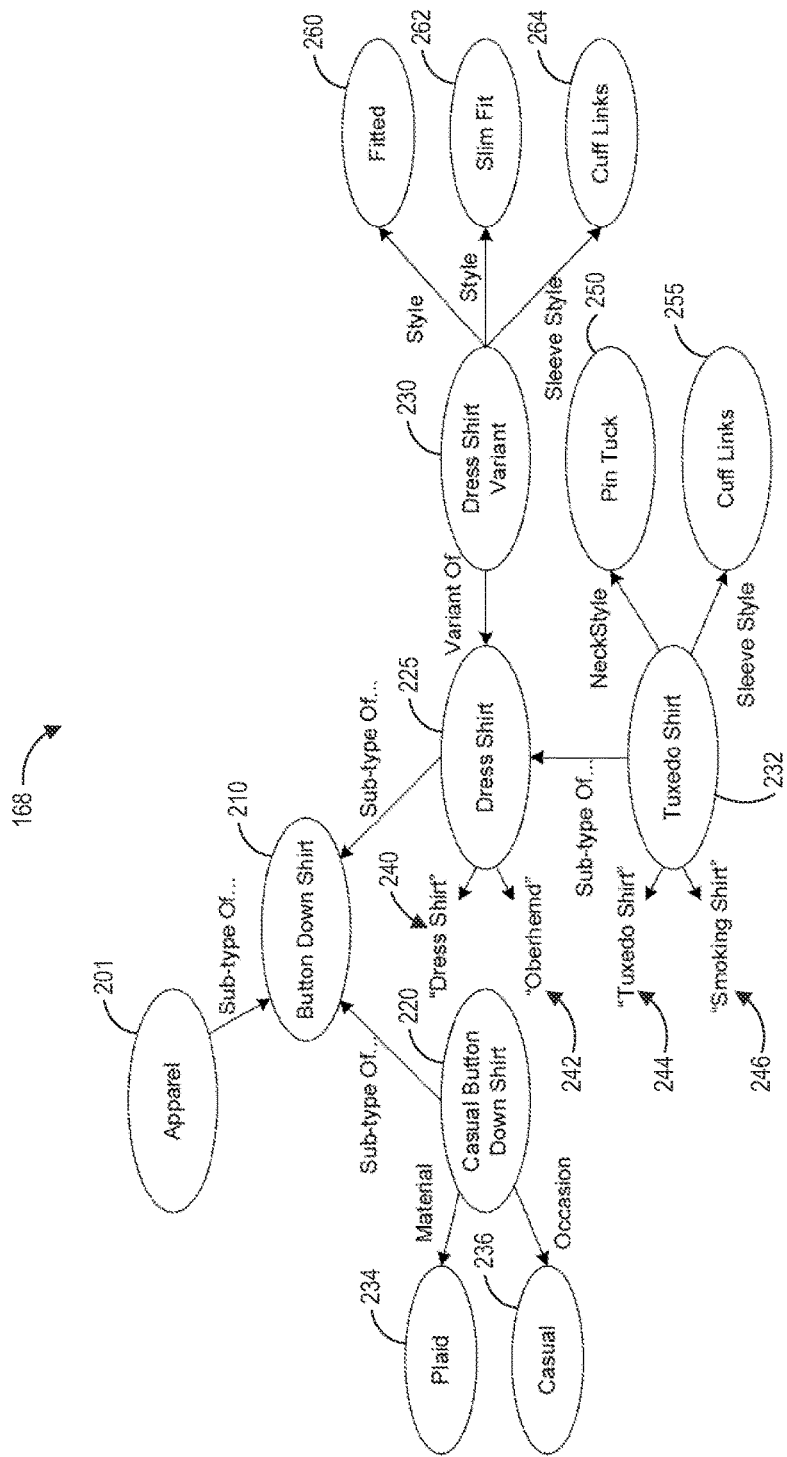
FIG. 2 depicts a portion of an item ontology depicting the relationship of concepts with items according to various embodiments of the present disclosure.

With respect to FIG. 2, an example of a selected portion of an item ontology 200 is shown that is associated with a button-down shirt 210. The selected portion of the item ontology 200 of the button-down shirt 210 may be part of the item ontology 168 of FIG. 1, discussed above. In this non-limiting example, the selected portion of the item ontology 200 depicts some of the core concepts associated with the button-down shirt 210 as a sub-type of apparel 201. As may be appreciated, one or more merchants may list a button-down shirt 210 in an electronic catalog. The merchant may not classify the item, and images of the item may be presented in a thematic image selection challenge and selectively associated with keywords based upon user responses to the thematic image selection challenges. Automatically determining which browse node in an item hierarchy to place the item may be accomplished by comparing keywords associated with the item with concepts in an item ontology 200.

As can be seen in FIG. 2, the core concepts in the ontology associated with the button-down shirt 210 closely resemble the description of the corresponding real-world entities. For example, a casual button-down shirt 220 and a dress shirt 225 may be types of button-down shirts 210 and may have certain stylistic features that distinguish one from another.

It is understood that the concepts in the selected portion of the item ontology 200, and their relationship with items and/or other concepts, may be defined by an administrator and/or may be determined automatically by building an item ontology. The concepts may be used to identify, for example, whether an item is a casual button-down shirt 220 or a dress shirt 225. For example, a shirt having a plaid material 234 may be classified as a casual button-down shirt 220. As another example, a shirt described as being for casual occasions 236 may be classified as a casual button-down shirt 220. A dress shirt 225, on the other hand, may be constructed from alternative materials or may be described as a more formal shirt. Thus, an item associated with keywords such as "button-down shirt" and "plaid," may be classified as a "Casual Button-down Shirt." The item may be placed in a browse node of an item hierarchy associated with casual button-down shirts 220, as may be appreciated.

It is understood that variations of items may exist in the item ontology 200. For example, dress shirts variants 230 may exist such as a fitted dress shirt 260, a slim fit dress shirt 262, and/or a fitted shirt 264 able to be used with cuff links. A subtype of a dress shirt 225 may be, for example, a tuxedo shirt 232. The concepts that identify whether or not shirt is a tuxedo shirt 232 may be the pin tuck neck style 250 or the cuff links sleeve style 255.

Keywords including various words, symbols, and/or phrases may be associated with the concepts in the item ontology 200 to assist in determining the placement of items in various item taxonomies in an electronic catalog. These words, symbols, and/or phrases may be used to express the same concepts in a variety of languages. For example, a "Dress Shirt" label 240 may be used to describe a dress shirt 225 in an item hierarchy associated with the English language. Alternatively, an "Oberhemd" label 242 may be used to describe a dress shirt 225 in an item hierarchy associated with the German language. As another non-limiting example, a shirt with a pin tuck neck style 250 and a cuff link sleeve style 255 may be used with a "Tuxedo Shirt" label 244 in the United States or a "Smoking Shirt" label 246 in the United Kingdom. Accordingly, the same item ontology 200 may be used to determine placement of an item in a variety of domestic or foreign item hierarchies, because the concepts describing the various characteristics of the item are universal regardless of the language used to express the item.

By comparing the keywords associated with an item description to the concepts in the item ontology, a type of the item may be determined as well as the relationship of the item among other items. Accordingly, the item may be placed in an appropriate browse node in an item hierarchy in an electronic catalog.

IV. Overview of Item Classification by Thematic Image Selection Challenge

Figure 3:
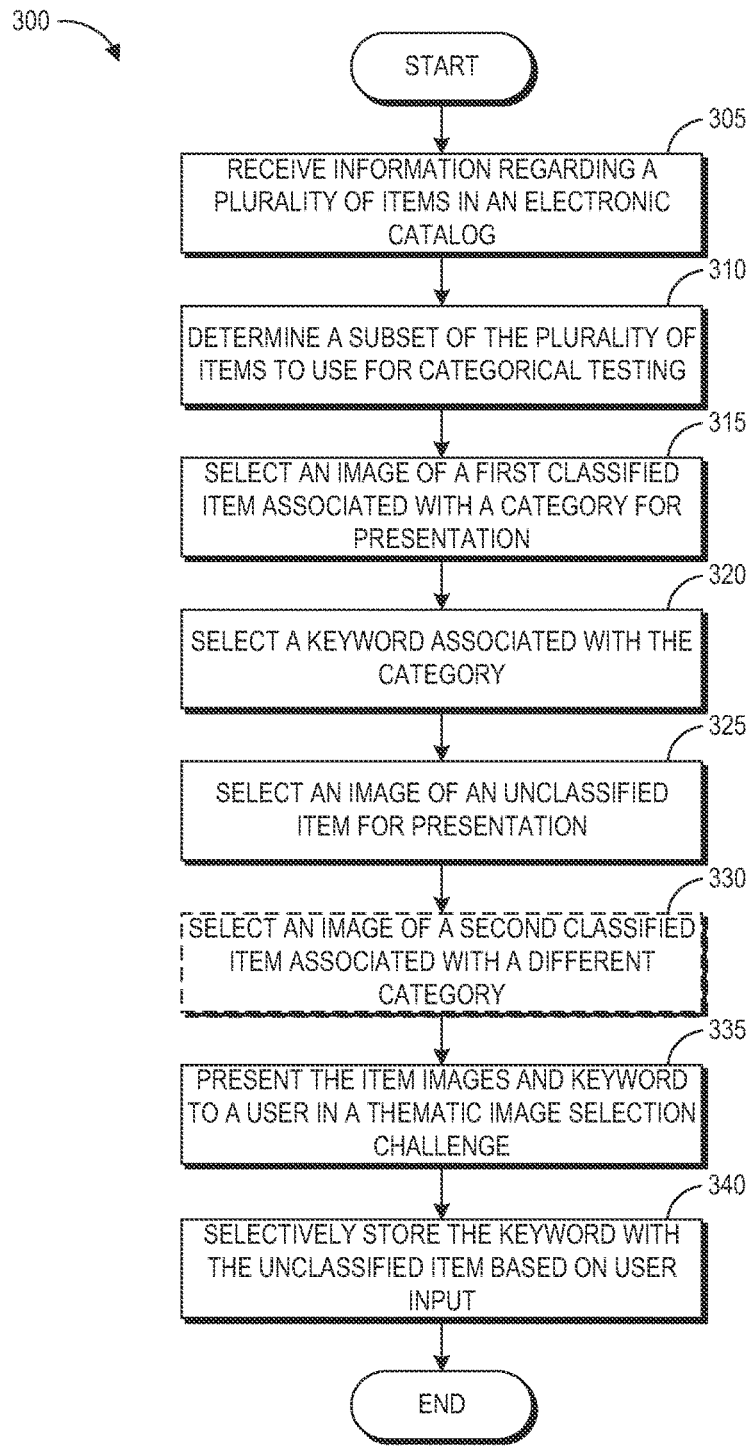
FIG. 3 depicts an embodiment of a thematic image selection challenge-guided item classification process.

FIG. 3 depicts an embodiment of a thematic image selection challenge-guided item classification process 300 which may be used to associate items in an electronic catalog with keywords, as well as an appropriate browse node or nodes. The process 300 may be implemented by one or both of the item classification service 150 and thematic image selection challenge service 130 of FIG. 1.

The process 300 begins at block 305 when information regarding a plurality of items in an electronic catalog is received. This information may be received, in some embodiments, by the item classification identification component 152 of FIG. 1. The information may include a plurality of items as well as an item title, description, and image for some or all of the items. The information may also include keywords associated with at least some of the items. Further, the information may include data representing a hierarchical data structure defining an organization and relationship of the items to one another, and may also include a browse node or node associated with some or all of the items.

At block 310, the process 300 determines a subset of the plurality of items to use for categorical testing. Categorical testing, as used herein, may refer to the general process of using a thematic image selection challenge in order to associate keywords with an item for the purpose of classifying the item into an item hierarchy. Block 310 may be performed, in some implementations, by the item classification identification component 152 of FIG. 1. The subset of items determined to be used for categorical testing may include both classified and unclassified items. As described above, classified items may be associated with one or more browse nodes in a hierarchy of the items, and unclassified items may be incorrectly associated, or not associated, with a browse node. Factors such as user traffic to an item detail page, merchant input, user input, or belonging to a polluted category may also be used to determine whether an item is a classified or unclassified item. The subset of items may include unclassified items that will be tested to assist in classifying the items, and may also include classified items to use for gauging assessing the usefulness of user input.

Accordingly, at block 315, the process 300 selects an image of a first classified item for presentation in a thematic image selection challenge, wherein the first classified item is associated with at least one category or browse node. This may be performed, in some implementations, by thematic image selection challenge generation component 154 of FIG. 1. The image may be selected from a plurality of images depicting the first classified item based on being a representative image of the first classified item, for example, by being the first image displayed on the item detail page, or by being indicated as a primary image by a merchant selling, or other third party otherwise providing, the first classified item. Next, at block 320, the process 300 selects a keyword associated with the category. The keyword may be associated with a parent node, child node, or any categorical node with which the classified item is associated. They keyword may also be selected based at least partly on also being in a title or item description of the first classified item.

Next, at block 325, an image of an unclassified item is selected for presentation in a thematic image selection challenge. This may also be performed, in some implementations, by the thematic image selection challenge generation component 154 of FIG. 1. The unclassified item may be selected based on being associated with the same parent node as the classified item, but may not be associated with any child nodes. Accordingly, presentation of the unclassified item image in a thematic image selection challenge may be used to classify the unclassified item into one or more child nodes. The image may be selected from a plurality of images depicting the unclassified item based on being a representative image of the unclassified item. In some implementations, a plurality of images of a plurality of unclassified items may be selected for presentation, together or sequentially, in a thematic image selection challenge.

In some embodiments, at block 330 an image of a second classified item may be optionally selected for presentation in a thematic image selection challenge based on the second classified item belonging to a different category than the first classified item. The second classified item may be selected based on a difference metric, which measures a level of dissimilarity between the first classified item category and the second classified item category, being above a threshold. The difference metric may be calculated based on comparison of concepts in an item ontology, for example, the item ontology 168 of FIG. 1. For example, the difference metric may be calculated based on a number of keywords associated with each of the first classified item category and the second classified item category which do not overlap, or based on the number of features unique to items within the first classified item category when compared to items the second classified item category. Accordingly, the second classified item is not likely to be associated with the keyword determined from the first classified item. Some embodiments of the process 300 may perform a search of a description and title of the second classified item to ensure that the selected keyword is not present.

Next, at block 335, the item images and keyword may be presented to a user in a thematic image selection challenge. This may be performed, in some implementations, by the thematic image selection challenge generation component 154 of FIG. 1, which may be in cooperative communication with the thematic image selection challenge service 130 of FIG. 1. The thematic image selection challenge generation component 154 may generate the thematic image selection challenge and send the generated challenge to the thematic image selection challenge service 130 for presentation on subscribing network resources, which may be, for example, web sites which elect or subscribe to use the thematic image selection challenge service 130 for security purposes.

The thematic image selection challenge may be presented in a graphical user interface such as a web page, pop-up window, browser application, mobile application, or any suitable interface configured to receive graphical information and display graphical components corresponding to the received information. The thematic image selection challenge presentation method may be dynamically modified based on a type of subscribing network resource implementing the thematic image selection challenge, or based on a device type or screen resulting of the user device requesting the thematic image selection challenge. For example, the thematic image selection challenge service 130 of FIG. 1 may determine a type of user device requesting the thematic image selection challenge, or may determine a screen resolution of the user device. The item images may be presented together for user devices with larger displays, such as laptops and tablets, and may be presented sequentially for user devices with smaller displays, such as a mobile phone.

To illustrate, the item images may be presented to a user along with a prompt including the keyword, such as "Please select all images of [insert keyword]." Users may be able to select images by clicking on the image, selecting a selectable radio button or checkbox, or inputting a list of selected image numbers, for example. The selected images may be provided with a visual indication of selection, for example, highlighting or a border displayed around a selected image. The user may be presented with a selectable option to submit their input. In some embodiments, the user may be asked to separate the item images associated with the keyword from the item images not associated with the keyword, for example, by selecting and dragging item images to different sides of a challenge box. In yet other embodiments, the user may be asked to put item images associated with the keyword in the appropriate place in a challenge environment. To illustrate, the keyword may be "Basketball" and items from a category of "Sports Equipment" may be categorically tested in the thematic image selection challenge. The user may be prompted to drop item images of a basketball through a basketball hoop presented in a challenge environment background, and the user may correctly respond by doing so, and by not dropping presented item images of a soccer ball or other types of sports equipment through the basketball hoop. Many implementations of the thematic image selection challenges are possible.

Next, at block 340, the process 300 selectively stores the keyword in association with the item based on user input. Block 340 may be implemented, in some embodiments, by the user input analysis component 156 of FIG. 1. Analysis of the user input may include determining a reliability index of the user input, wherein the reliability index is based on correct user selection of classified items. The reliability index may be calculated by determining whether the image of the first classified item was selected. If the user correctly selects the image of the first classified item associated with the keyword, then the reliability index may be set to "1" in some embodiments, indicating that the user input is likely to be accurate or reliable, and the item classification service may determine whether any of the images of unclassified items have also been selected and may store the keyword in association with the selected unclassified items. If the user does not correctly select the first classified item image associated with the keyword, then the reliability index may be set to "0" in some embodiments, indicating that the user input is likely to be inaccurate or unreliable, and the process 300 may not store the keyword in association with any selected unclassified images. In embodiments which also present a second unclassified item, if the user incorrectly selects the second unclassified item which is not associated with the keyword, then the reliability index may be set to "0," indicating that the user input is likely to be inaccurate or unreliable, and the process 300 may not store the keyword in association with any selected unclassified images.

As described above, the process 300 may take measures to ensure that keywords are correctly associated with unclassified items in order to provide for more robust keyword associations. For example, images of the same set of classified items and unclassified items may be presented to a number of users of the thematic image selection challenge service, and statistical data representing the image selections for a number of users may be collected. If the same unclassified item is selected by a threshold percentage of the number of users, then the item classification service may associate the keyword with the unclassified item.

The process 300 may be iterative in that, once a child node is determined for an unclassified item, the unclassified item may be categorically tested in further thematic image selection challenges to ascertain whether the unclassified item belongs to any sub-nodes or grandchild nodes until a most specific node is determined for the unclassified item. The unclassified item may then be identified as a classified item, and may be used in subsequent thematic image selection challenges as a classified item.

To illustrate, both the first classified and unclassified items may belong to a parent node such as "Cameras." The classified item may belong to the child node of "Digital Cameras" and the grandchild node of "Astronomical CCD (charge-coupled device) Cameras," and the keyword selected at block 320 may be "Digital Camera." Accordingly, by presenting the unclassified item in the thematic image selection challenge and by asking users to identify all images of digital cameras, the unclassified item may be determined based upon user input to belong or not belong to the child node of "Digital Camera." If it is determined from analysis of user input that the unclassified item belongs to the child node, a subsequent thematic image selection challenge may further refine classification of the unclassified item by selecting a new keyword of "Astronomical CCD Camera." Some grandchild or sub-nodes may be determined, for example, by frequent user requests for a new CAPTCHA, to be too specific for usefulness in thematic image selection challenges presented to a general population of network users, and the process 300 may not conduct further categorical testing using keywords associated with such grandchild or sub-nodes. In such instances, the unclassified item may be categorically tested until associated with a last useful child node or sub-node.

In embodiments also presenting a second classified item, the second classified item may be, for example, a tuxedo t-shirt and may belong to a parent node of "Apparel." The "Apparel" parent node may be selected based on having a difference metric, which measures dissimilarity between the first classified item category and the second classified item category, above a threshold. Accordingly, a human user would be unlikely to select both the image of the astronomical CCD camera and the tuxedo t-shirt when presented with a thematic image selection challenge requesting the user to identify all images associated with the keyword of "digital camera." Presentation of a second classified item selected based on the difference metric may therefore provide a robust gauge for the correctness of user response to thematic image selection challenges.

Although the process 300 has been discussed in the context of classifying items, the process 300 has other applications as well. For example, the process 300 may be used to determine whether images of items in an electronic catalog include prohibited or undesired content, or whether the images otherwise violate the image policies or terms of service of the electronic catalog. An image policy of the electronic catalog may include image attributes, such as prohibited image attributes, and information regarding the image policy may be provided to the item classification process 300. The process 300 may select a keyword that describes one of the image attributes, and may indicate that images selected in association with the keyword should be removed from or not displayed in the electronic catalog. To illustrate an example of an image policy, an electronic catalog may specify to merchants that item images may not include mannequins (e.g., images must use human models). Accordingly, the process 300 may select apparel or accessory item images for presentation to a user in a thematic image selection challenge that prompts the user to identify any images including mannequins. In order to determine a reliability index of user input to the image selection challenge, at least one of the selected images may be known to depict a mannequin modeling an item, and in some embodiments, at least one of the selected images may be known to depict a human modeling an item. Based on user input, or on statistics collected from cumulative user input, images associated with the keyword "mannequin" may be removed from the electronic catalog or otherwise marked as an image to no longer display in the electronic catalog. In an alternative example, the thematic image selection challenge may prompt the user to identify any images including humans. Based on user input, or on statistics collected from cumulative user input, images not selected as including humans may be presumed to include mannequins (or other prohibited content) and may be marked for removal from, or prevented from being displayed in, the electronic catalog.

As other examples, it may be desirable to identify other image attributes such as image quality, color, background (e.g., non-white backgrounds may be prohibited), focus, or resolution. For example, the process 300 may be used to determine whether an image is in color, whether an image is in grayscale, or whether an image has a white or other colored background. The process 300 may also be used to identify image content, such as whether an image includes text, whether an image includes more than one item, whether an image is offensive, whether an image depicts an entire item, whether the image is a photograph or a drawing, or whether an image unclearly depicts an item. The process 300 may also be used to determine whether the image is the official cover art for an album, book, or movie. Thematic image selection challenges may be used to identify a wide variety of image attributes and may be used to automatically remove, mark for removal, or prevent the display of undesirable images from an electronic catalog. Image attributes may also be identified, in some implementations, for image classification purposes, and the images may be classified as being of a certain image type instead of being removed from the electronic catalog.

V. Item Classification Overview

Figure 4:
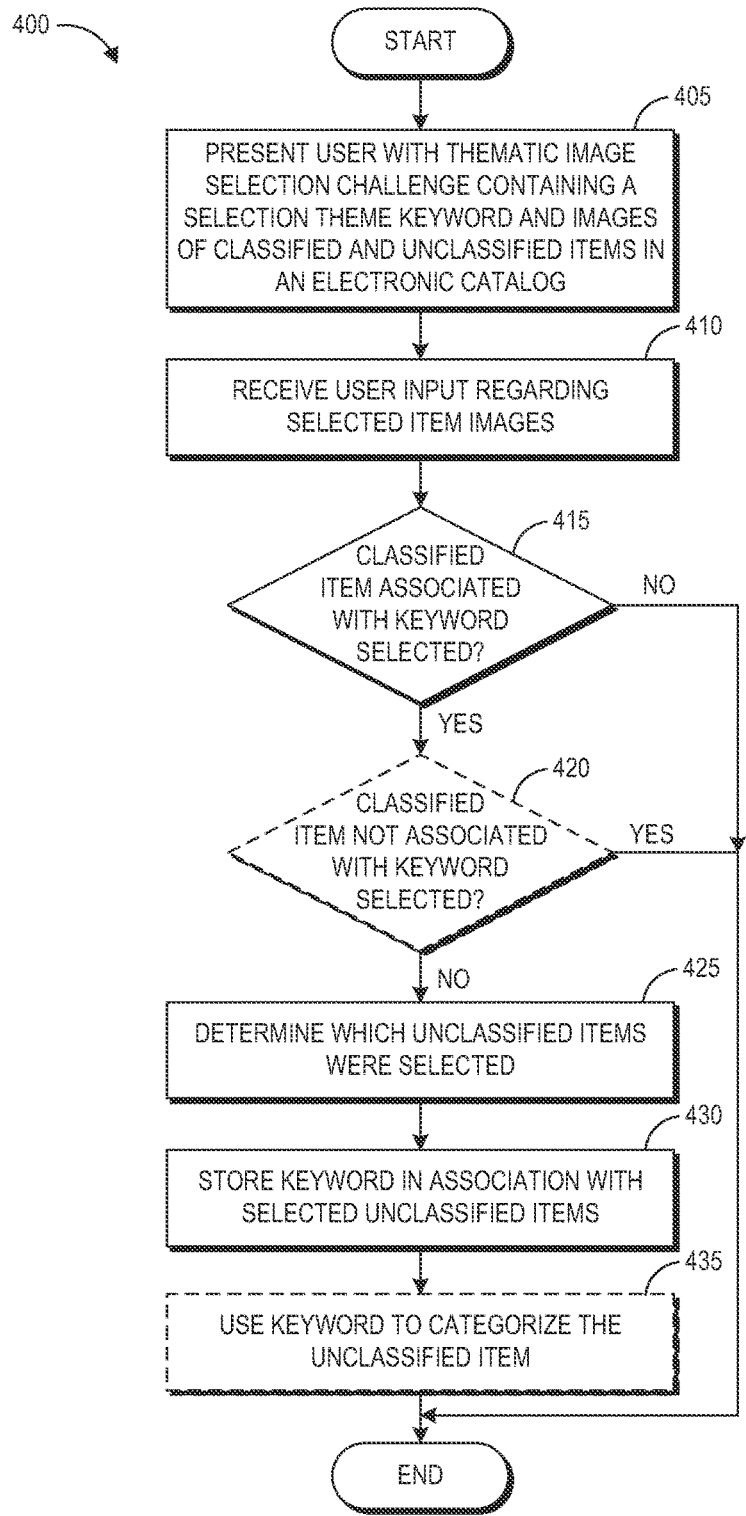
FIG. 4 depicts an embodiment of a process for selectively storing keywords in association with items selected in a thematic image selection challenge.

FIG. 4 depicts an embodiment of a process 400 for selectively storing keywords in association with items selected in a thematic image selection challenge. The process 400 may be implemented, in some embodiments, by the user input analysis component 156 of FIG. 1, and may be executed at block 340 of the process 300 illustrated in FIG. 3.

The process 400 begins at block 405, in which a user is presented with a thematic image selection challenge including a selection theme keyword and images of classified and unclassified items in an electronic catalog. As described above with respect to blocks 305-335 of FIG. 3, classified items and unclassified items may be identified from information provided regarding a plurality of items in the electronic catalog. Images of at least one classified item and at least one unclassified item may be selected for presentation in a thematic image selection challenge together with a keyword associated with the classified item and/or a category of the classified item. The thematic image selection challenge may be presented, for example, as a CAPTCHA to a user attempting to access a network resource. Block 405 may be performed, in some implementations, by components of the item classification service 150 and by the thematic image selection challenge service 130 of FIG. 1.

Next, at block 410, the process 400 receives user input regarding selected item images. The input may be received, in some embodiments, by the user input analysis component 158 from the thematic image selection challenge service 130 of FIG. 1. User input may include information regarding selected item images, and may also include user requests for a different thematic selection challenge. At block 415, the process 400 analyzes the user input to determine whether the image of the classified item associated with the keyword was selected. If the image of the classified item associated with the keyword was not selected, then the process 400 determines that the user is either a bot or a human making inaccurate item image selections, and therefore the rest of the user input is disregarded for item classification purposes and the process 400 ends. If the image of the classified item associated with the keyword was selected, then the process 400 determines that the user may be a human making accurate item image selections, and the process 400 optionally continues to decision block 420.

At block 420, the process optionally determines whether an image of a classified item not associated with the keyword was selected. As discussed above with respect to FIG. 3, a second classified item image may be presented in the thematic image selection challenge, wherein the second classified item is determined to have above a threshold level of a difference metric from the first classified item, and wherein a description and title of the second classified item do not contain the selected keyword. The process 400 at block 420 may also implement images not sourced from an electronic catalog, but which are known to not be associated with the keyword, e.g., by presenting images of cute animals. Accordingly, if, at block 420, the process 400 determines that the image of the classified item not associated with the keyword was selected, then the process 400 determines that the user is either a bot or a human making inaccurate item image selections, and therefore the rest of the user input is disregarded for item classification purposes and the process 400 ends. If the image of the classified item not associated with the keyword was not selected, then the process 400 determines that the user may be a human making accurate item image selections, and the process 400 continues to block 425.

At block 425, the process 400 determines which images of unclassified items, if any, were selected. Based on the decisions made at blocks 420 and 425, it is more likely that such selected unclassified items are associated with the keyword. Thus, at block 430, the process 400 stores the keyword in association with the unclassified item. As discussed above, the keyword may be stored in association with the unclassified item after collection of statistical data from a threshold number of users indicates that the unclassified item is associated with the keyword. The keyword may be stored in the electronic catalog 161 of the data repository 160 illustrated in FIG. 1.

Optionally, at block 435, the process 400 may use the keyword to classify the unclassified item. For example, the keyword may be compared to concepts in an item ontology 168 and matched to a browse node in an item hierarchy 166, as discussed above with respect to FIG. 1. Block 435 may be performed, in some implementations, by the ontological classification component 158 of FIG. 1.

VI. User Interface Overview

Figure 5A:
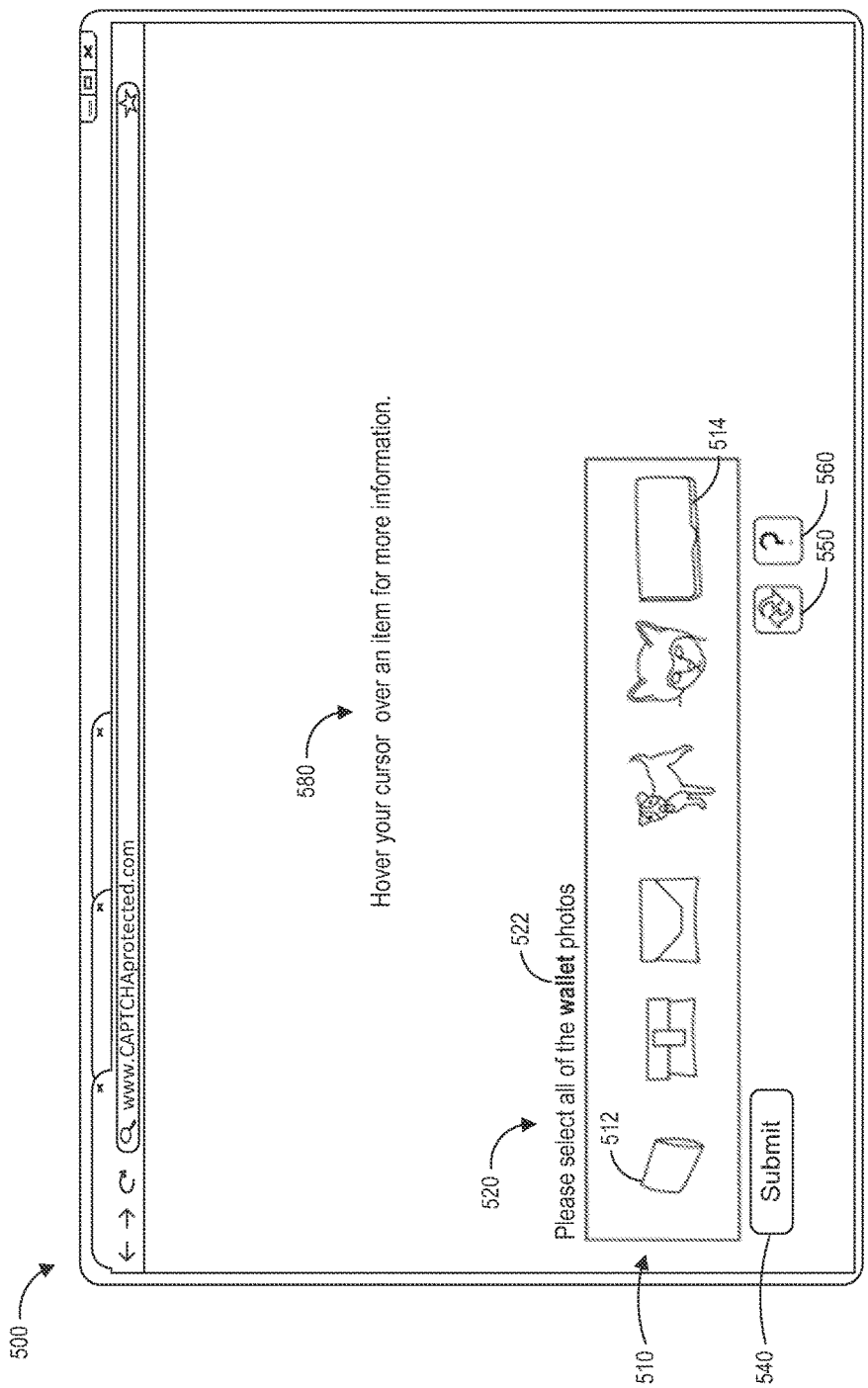
FIGS. 5A and 5B depict embodiments of a user interface illustrating items in an electronic catalog which can be made available for selection through a thematic image selection challenge.

FIG. 5A depicts one embodiment of a user interface illustrating items in an electronic catalog available for selection through a thematic image selection challenge 500. The thematic image selection challenge 500 may include a CAPTCHA box 510 that presents item images 512 to a user for selection according to a prompt 520. The prompt 520 may include a keyword 522 selected according to the processes described above with respect to FIGS. 1 and 3. Although illustrated in bolded font, this is merely to emphasize the keyword 522 in the depicted example. The keyword 522 may or may not be of a different format (e.g., font, color, highlight, etc.) than the rest of the prompt 520 in other embodiments. The prompt 520 may request that the user select images thematically related to the keyword 522. The thematic image selection challenge 500 may also optionally include information 580 alerting the user that they may receive more information about the items depicted in the item images 512, and may include an explanation of how the user may select an item of interest 514 to be presented with more information.

The thematic image selection challenge 500 may include a selectable option 540 for the user to submit their input. The thematic image selection challenge 500 may include a refresh option 550 to be presented with a new thematic image selection challenge, and may also include a help option 560 which may explain the thematic image selection challenge to a user who is unfamiliar with such challenges, or which may provide audio information on the thematic image selection challenge for visually impaired users.

The item images 512 presented in the CAPTCHA box 510 may be presented together to a user in a graphical interface. The item images 512 may be arranged on a solid background in a grid, or may be placed on a challenge environment background. As explained above, a challenge environment background displaying a basketball hoop may be presented instead of the illustrated solid-background CAPTCHA box 510 in some embodiments. Images of various sports equipment items may be presented over the challenge environment background away from the basketball hoop. The user may be prompted to drop item images of a basketball through a basketball hoop presented in a challenge environment background, and the user may correctly respond by doing so, and by not dropping presented item images of other types of sports equipment through the basketball hoop.

In another embodiment, the item images may be presented sequentially, or one at a time, in a CAPTCHA box sized to fit one item image at a time. For example, the thematic image selection challenge service 130 of FIG. 1 may determine a type of user device requesting the thematic image selection challenge, or may determine a screen resolution of the user device. The item images may be presented together for user devices with larger displays, such as laptops and tablets, and may be presented sequentially for user devices with smaller displays, such as a mobile phone.

Figure 5B:
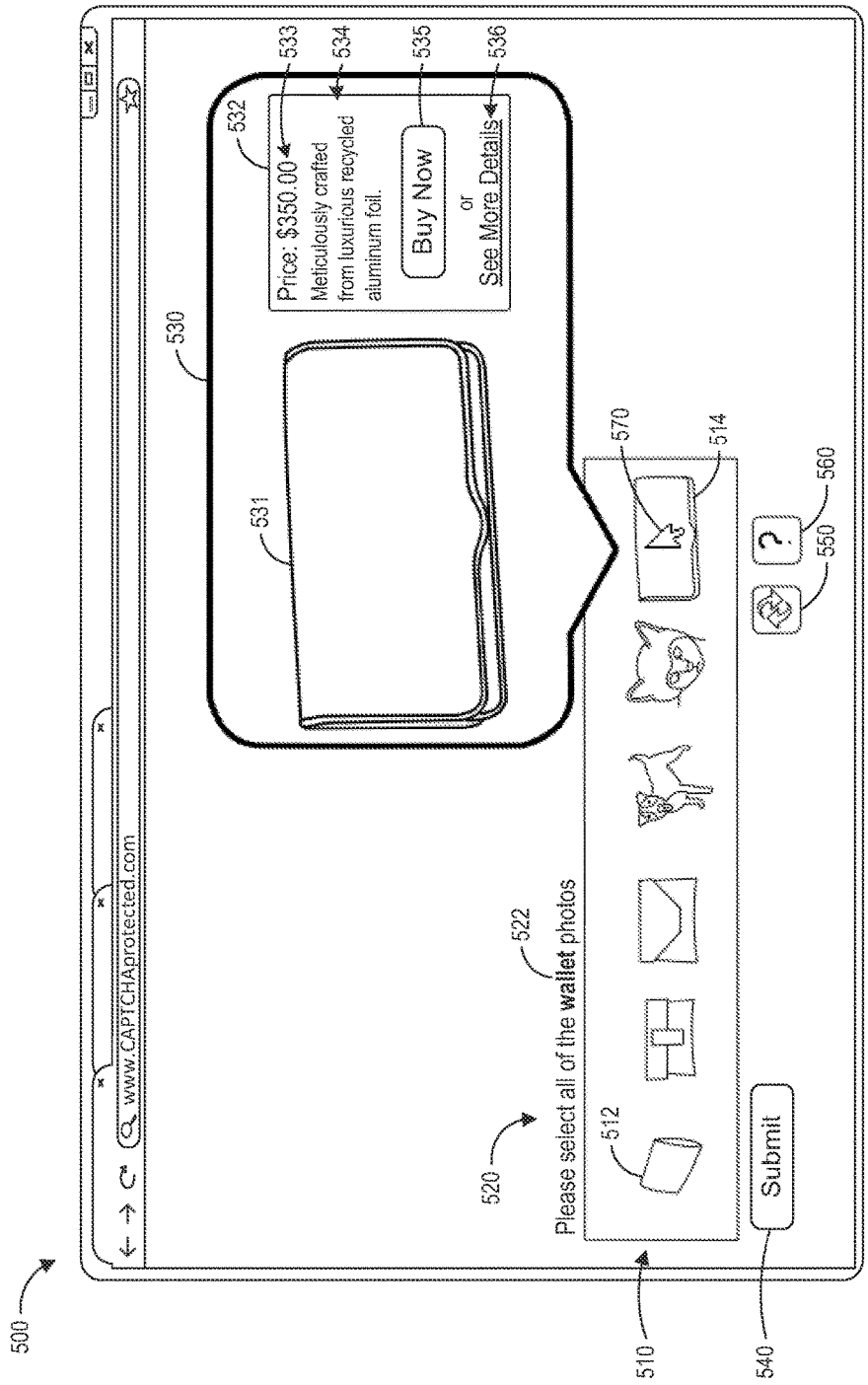

In some implementations, as illustrated in FIG. 5B, the thematic image selection challenge 500 may include functionality that permits the user to purchase or find out additional information about items 512 presented in the challenge. For example, the system 100 may determine that one of the items 512 is of interest to the user, such as the item 514 in the illustrated embodiment. User interest in an item may be determined, in some embodiments, by the user hovering a cursor 570 over the item image for a threshold period of time, clicking on an item image or double clicking on an item image, eye tracking programs and techniques determining that the user views the item image for a threshold period of time, or by the user selecting a selectable option for more information, to name a few examples.

Once user interest is determined, more information about the item may be presented to the user such as in item preview 530. Item preview 530 may be presented as a graphical interface within a mobile application or a browser application, for example, as a pop up window, or a new tab or window opened in the mobile application or browser application. Item preview 530 may present a larger image 531 of the item as well as an item information box 532. The item information box 532 may include, for example, item price 533, part or all of an item description 534, an option to purchase the item 535, and at least one user selectable feature 525, 536 associated with more information about the item of interest 514. The user selectable feature 536 may be, in some embodiments, a hyperlink, which may direct the user to an item detail page associated with the item of interest 514. The user selectable feature 535 may be a selectable option to purchase the item of interest 514. Thus, a user may be able to view and purchase an item of interest in an electronic catalog directly from the thematic image selection challenge. This is beneficial, as typically, if a user sees an item of interest depicted in a thematic image selection challenge, the user must attempt to locate the item on his or her own through keyword searching, as image-based searching may not be very robust. Due to the large number of similar items stored in a network such as the Internet, this keyword based search approach is unlikely to yield the desired item to the user. Providing a user selectable feature that may generate an item detail page for presentation to the user therefore advantageously provides a direct channel for viewing or purchasing an item of interest discovered by the user in the thematic image selection challenge.

In some embodiments, the item of interest 514 may be made available for selection in the electronic catalog by a merchant or other party. For example, a merchant may feel that some of its items are not selling as expected, possibly due to improper classification of its item images, which can hinder the ability of purchasers to search for and find the merchant's items. The electronic catalog may suggest to the merchant and/or the merchant may request that the item of interest 514 be presented to users of thematic image selection challenges, for example, by the thematic image selection challenge service 130 of FIG. 1. For example, the merchant may desire more user traffic to an item detail page associated with the item of interest 514, or may desire better classification of the item of interest 514 by the image categorization service 150 of FIG. 1. In some implementations, the electronic catalog (and/or provider of the thematic image selection challenge) may charge the merchant a fee to have the merchant's images included in the challenge and/or when the user expresses interest the item of interest 514. In another implementation, the electronic catalog (and/or the provider of the thematic image selection challenge) may charge the merchant a fee when a user selects a user selectable feature 535, 536. In some embodiments, the fee may be higher when the user selects the user selectable feature 535 to purchase the item than when the user selects the user selectable feature 526 to view more information about the item. A network resource using the thematic image selection for security purposes may, in some implementations, receive a portion of the fee.

VII. Item Sales Channel Overview

Figure 6:
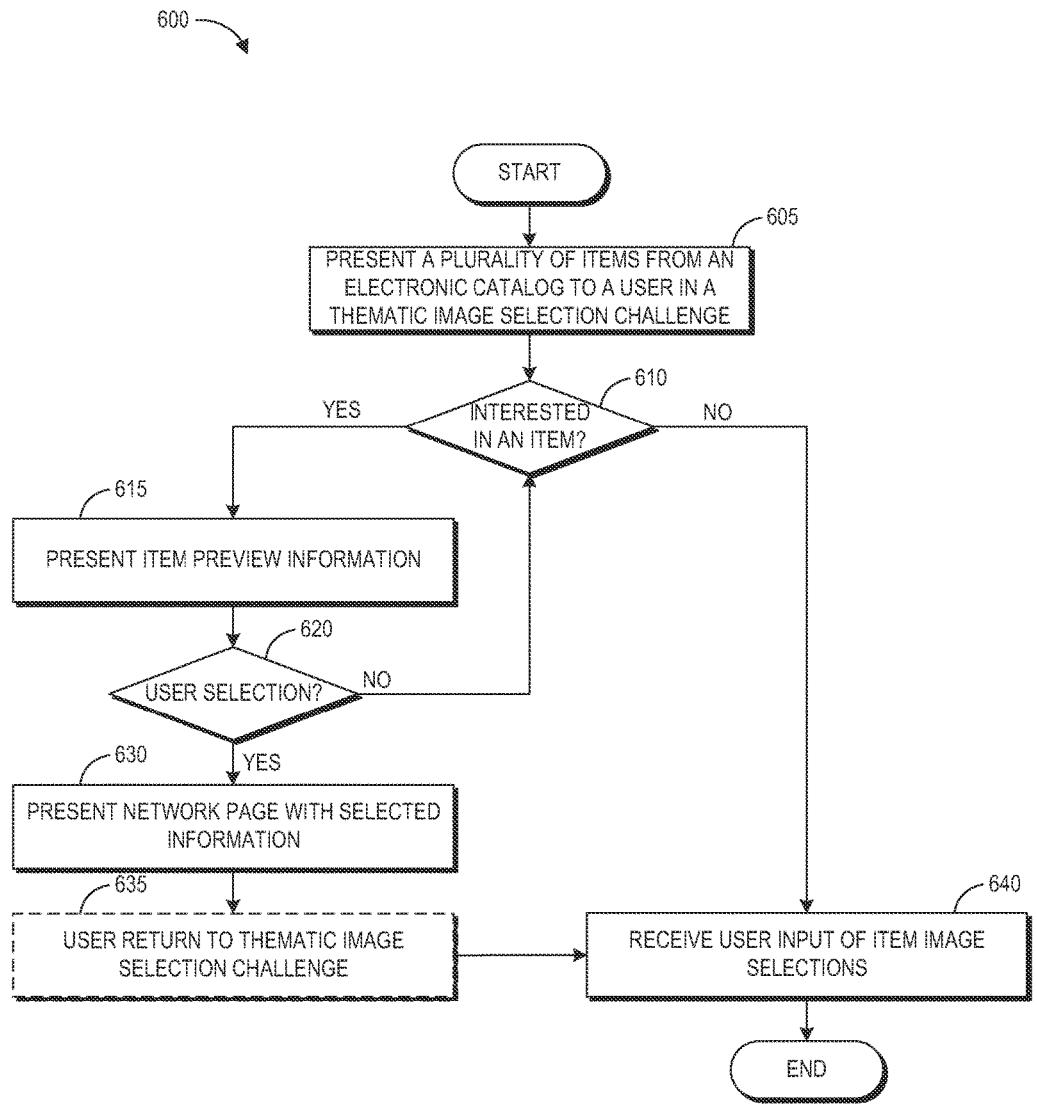
FIG. 6 depicts an embodiment of a process for presenting more information about items of interest to thematic image selection challenge users.

FIG. 6 depicts an embodiment of a process 600 for presenting more information about items of interest to thematic image selection challenge users. The process 600 may be carried out by the item preview service 170 of FIG. 1 in some embodiments.

The process 600 begins at block 605 in which a user is presented with a plurality of items from an electronic catalog in a thematic image selection challenge. As described above with respect to blocks 305-335 of FIG. 3, images of classified items and unclassified items are presented together for categorical testing of the unclassified images. The thematic image selection challenge may be presented, for example, as a CAPTCHA to a user attempting to access a network resource. Block 605 may be performed, in some implementations, by components of the item classification service 150 and by the thematic image selection challenge service 130 of FIG. 1.

At decision block 610, the process 600 determines whether the user is interested in one of the items presented in the thematic image selection challenge. Block 610 may be executed continuously or periodically during the time in which a user is completing a thematic image selection challenge. As discussed above, user interest in an item may be determined in a variety of ways based on user interaction with the image of the item of interest in the item preview. Interest may be determined, for example, by the user hovering a cursor over the item image for a threshold period of time, clicking on an item image or double clicking on an item image, eye tracking programs and techniques determining that the user views the item image for a threshold period of time, or by the user selecting a selectable option for more information. If the process 600 determines that a user is not interested in any item, then the process 600 transitions to block 640 in which user input of item image selections is received and the process 600 ends.

If the process 600 determines that a user is interested in any item, then the process 600 transitions to block 615 in which item preview information is presented. For example, block 615 may present the user with a graphical item preview page or network resource, such as the item preview 530 in FIG. 5, described above. The item preview may present the user with additional information as well as an option to purchase the item, and may also present the user with a user selectable feature associated with further item information.

At decision block 620, the process 600 determines whether the user has selected any of the options presented in the item preview. If, after a specified period of time the user does not select any of the options, or if the user selects an option to close or remove the item preview, then the process 600 loops back to block 610 in which the process 600 looks for cues of user interest in an item. If the user does select an option in the item preview, then the process 600 transitions to block 630 in which the user is presented with a network page, such as a web page, including the selected information. For example, the user may be directed to an item detail page if the user selected a user selectable feature, such as a hyperlink to the item detail page, or the user may be directed to a purchase page if the user selected a user selectable feature to buy the item. Such additional selected information may open in a new browser application window or tab in order to allow the user to later return to the thematic image selection challenge.

At block 635, the process 600 optionally resumes with the user's return to the thematic image selection challenge. The process 600 may determine that the user has returned to the browser application window or mobile application window that previously displayed the thematic image selection challenge, or may direct the user back to the thematic image selection challenge after the user has concluded the interaction with selected item information. Next, the process 600 moves to block 640 in which user input of item image selections is received, for example, according to the processes 300, 400 described above with respect to FIGS. 3 and 4, and the process 600 ends.

VIII. Terminology

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved. Each of the processes, methods, and algorithms described in the preceding sections may be embodied in, and fully or partially automated by, code modules executed by one or more computers, computer processors, or hardware machines configured to execute computer instructions. The code modules may be stored on any type of non-transitory computer-readable medium or tangible computer storage device, such as hard drives, solid-state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It should be emphasized that many variations and modifications may be made to the above-described embodiments, the elements of which are to be understood as being among other acceptable examples. All such modifications and variations are intended to be included herein within the scope of this disclosure and protected by the following claims. No single feature or group of features is essential or required for each embodiment.

What is claimed is:

1. A computer-implemented method comprising:
as implemented by a computing device configured with specific executable instructions,
receiving information regarding an electronic catalog of items, the information comprising:
data regarding a plurality of items available for selection in the electronic catalog,
a plurality of item images, each item image depicting an item of the plurality of items, and
data regarding a hierarchy of a plurality of categories;
identifying a plurality of classified items and a plurality of unclassified items, wherein each of the plurality of classified items is associated with a category of the plurality of categories;
generating an image selection challenge for presentation to a user, the image selection challenge comprising a keyword and a plurality of images including a first image depicting a first classified item, a second image depicting a second classified item, and a third image depicting an unclassified item, wherein the keyword is associated with a first category of the first classified item and is not associated with a second category of the second classified item;
receiving user input comprising selection of at least one of the first image, the second image, or the third image of the image selection challenge;
based at least partly on the user input, using the keyword to associate the unclassified item with a category of the plurality of categories;
determining user interest in an item of interest of any of the first classified item, second classified item, or unclassified item represented in the image selection challenge;
generating an item preview for presentation to the user, the item preview comprising a graphical representation of information about the item of interest and including a user selectable feature to purchase the item of interest; and
causing presentation of the item preview including the user selectable feature together with the image selection challenge wherein, by selecting the user selectable feature, the user can purchase the item of interest directly from the image selection challenge.

2. The computer-implemented method of claim 1, wherein the unclassified item satisfies a criterion, and wherein the criterion is a least one of:
(a) the unclassified item is not associated with a category of the plurality of categories;
(b) the unclassified item is incorrectly associated with a category of the plurality of categories;
(c) the unclassified item is associated with a polluted parent category;
(d) the unclassified item has received less than a threshold amount of user traffic to a network page associated with the unclassified item; or
(e) a party providing a subset of the items for selection in the electronic catalog indicates that the item is an unclassified item.

3. The computer-implemented method of claim 1, wherein using the keyword to associate the unclassified item with a category of the plurality of categories comprises:
determining that the user selected the first image and second image, and did not select the third image, and storing the keyword in association with the unclassified item.

4. The computer-implemented method of claim 1, wherein using the keyword to associate the unclassified item with a category of the plurality of categories comprises associating the unclassified item with the first category.

5. The computer-implemented method of claim 1, wherein the image selection challenge further comprises a fourth image of an additional unclassified item, the method further comprising selectively storing the keyword in association with the additional unclassified item based at least partly on the user input.

6. The computer-implemented method of claim 1, wherein an ontology classifier uses the keyword to assign the unclassified item to the first category.

7. A system comprising:
a data store configured to store information regarding a plurality of items; and
a computing device in communication with the data store, the computing device configured to at least:
select a plurality of images for presentation to a user in an image selection challenge, wherein the plurality of images represent a plurality of items from an electronic catalog, wherein to select the plurality of images the computing device is configured to at least:
identify, from the plurality of items, a plurality of classified items and a plurality of unclassified items, wherein each of the plurality of classified items is associated with a category of the plurality of categories;
generate the image selection challenge comprising a keyword, a first image depicting a first classified item, a second image depicting a second classified item, and a third image depicting an unclassified item, wherein the keyword is associated with a first category of the first classified item and is not associated with a second category of the second classified item;
cause presentation of the image selection challenge to the user;
based at least partly on user input comprising selection of at least one of the first image, the second image, or the third image of the image selection challenge, use the keyword to associate the unclassified item with a category of the plurality of categories;

determine user interest in an item of interest of any of the first classified item, second classified item, or unclassified item represented in the image selection challenge;

generate an item preview for presentation to the user, the item preview comprising a graphical representation of information about the item of interest and including a user selectable feature to acquire the item of interest; and cause presentation of the item preview including the user selectable feature together with the image selection challenge wherein, by selecting the user selectable feature, the user can acquire the item of interest directly from the image selection challenge.

8. The system of claim 7, wherein the user selectable feature comprises functionality to select a network page associated with the item of interest.

9. The system of claim 7, wherein user interest is determined based at least partly on user interaction with an image of the item of interest in the item preview.

10. The system of claim 9, wherein the user interaction with the image of the item of interest in the item preview comprises at least one of the user hovering a cursor over the item image for a threshold period of time, the user clicking on an item image, the user double clicking on an item image, the user viewing the item image for a threshold period of time, or by the user selecting an option for more information.

11. The system of claim 7, wherein the item preview further comprises an item price.

12. The system of claim 7, wherein at least one of the plurality of images is provided by a third party, the third party having an item available for selection in the electronic catalog.

13. The system of claim 12, wherein a fee is charged to the third party when the user selects the user selectable feature.

14. The system of claim 13, wherein the fee is greater when the selected user selectable feature comprises an option to purchase the item of interest than when the selected user selectable feature comprises a hyperlink to a network page associated with the item of interest.

15. A non-transitory, computer-readable medium containing computer-executable instructions that, when executed by a computing device, cause the computing device to at least:

receive information for a plurality of items in an electronic catalog, wherein the information comprises information regarding a hierarchy of a plurality of categories, and wherein each of at least some of the plurality of items is associated with a category of the plurality of categories;

determine a subset of the plurality of items to use for categorical testing;

select a keyword and a plurality of images for presentation to a user in an image selection challenge, each of the plurality of images depicting an item of the subset of the plurality of items;

cause presentation of the image selection challenge to the user;

receive input indicating images selected by the user from the plurality of images in the image selection challenge;

based at least partly on the input, use the keyword to associate an item depicted by an image of the images selected by the user with a category of the plurality of categories or to identify an image attribute of the image of selected by the user;

determine user interest in an item of interest represented by one of the plurality of images presented in the image selection challenge;

generate an item preview for presentation to the user, the item preview comprising a graphical representation of information about the item of interest and including a user selectable feature to acquire the item of interest; and cause presentation of the item preview including the user selectable feature together with the image selection challenge wherein, by selecting the user selectable feature, the user can acquire the item of interest directly from the image selection challenge.

16. The non-transitory, computer-readable medium of claim 15, wherein the instructions further cause the computing device to at least:

select an image of a first classified item for presentation in the image selection challenge, wherein the first classified item is associated with a first category of the plurality of categories; and select a keyword for presentation in a user prompt requesting that the user select images thematically related to the keyword, wherein the keyword is associated with the first category.

17. The non-transitory, computer-readable medium of claim 16, wherein the instructions further cause the computing device to at least select an image depicting an unclassified item for presentation in the image selection challenge.

18. The non-transitory, computer-readable medium of claim 17, wherein the instructions further cause the computing device to at least determine that the input indicates selection by the user of the image depicting the classified item.

19. The non-transitory, computer-readable medium of claim 17, wherein the instructions further cause the computing device to at least:

determine that the input indicates selection by the user of the image depicting the unclassified item; and use the keyword to associate the unclassified item with a category of the plurality of categories.

20. The non-transitory, computer-readable medium of claim 19, wherein the instructions further cause the computing device to at least use the keyword to associate the unclassified item with a category of the plurality of categories in response to statistical data representing selection of the image depicting the unclassified item in association with the keyword by a threshold number of users.

21. The non-transitory, computer-readable medium of claim 15, wherein the image selection challenge further comprises a prompt, the prompt comprising a keyword, and wherein the instructions further cause the computing device to at least:

determine a reliability index of the input; and based at least partly on the reliability index of the input, use the keyword to associate the item depicted by the image selected by the user with the category of the plurality of categories.

22. The non-transitory, computer-readable medium of claim 15, wherein, when using the keyword to identify the image attribute of the image selected by the user, the instructions further cause the computing device to at least:

receive information regarding an image policy of the electronic catalog, the image policy comprising a prohibited image attribute;

select the keyword based at least partly on the prohibited image attribute, and provide an indication that the image selected by the user should be removed from the electronic catalog or not presented for display.

23. The non-transitory, computer-readable medium of claim 15, wherein the image attribute comprises one of image color, background, focus, resolution, or content.

24. The non-transitory, computer-readable medium of claim 15, wherein the instructions further cause the computing device to at least determine the user interest in the item of interest based at least partly on the user interacting with an image of the plurality of images depicting the item of interest in the image selection challenge.

25. The non-transitory, computer-readable medium of claim 15, wherein the instructions further cause the computing device to at least cause presentation of the item preview as a window over a graphical user interface depicting the image selection challenge.

\* \* \* \* \*